United States Patent [19]
Niedospial, Jr.

[11] Patent Number: 5,337,971
[45] Date of Patent: Aug. 16, 1994

[54] TORQUE TRANSMISSION CLUTCH FOR FILM SPOOL

[75] Inventor: John J. Niedospial, Jr., Princeton Junction, N.J.

[73] Assignee: Eastman Kodak Company, Rochester, N.Y.

[21] Appl. No.: 40,952

[22] Filed: Mar. 31, 1993

[51] Int. Cl.5 .............................. G03B 17/26
[52] U.S. Cl. .................... 242/348; 242/349; 242/394; 354/275; 464/37; 192/56 R
[58] Field of Search ............ 242/71, 68.1, 68.2, 242/68.3, 200, 201; 464/37, 30, 51; 192/56 R; 354/275

[56] References Cited

U.S. PATENT DOCUMENTS

| | | | |
|---|---|---|---|
| 2,634,650 | 4/1953 | Coop | 464/37 |
| 2,826,107 | 3/1958 | Woods | 464/37 |
| 3,784,001 | 1/1974 | Bushnell et al. | 206/52 F |
| 3,794,269 | 2/1974 | Hoover | 242/194 |
| 3,942,338 | 3/1976 | Furlette et al. | 192/56 R |
| 4,610,340 | 9/1986 | Helmes et al. | 192/56 R |
| 4,969,301 | 11/1990 | Warden | 464/37 |
| 5,090,532 | 2/1992 | Bich | 192/56 R |
| 5,151,730 | 9/1992 | Kemp et al. | 354/275 |

*Primary Examiner*—Daniel P. Stodola
*Assistant Examiner*—John Q. Nguyen
*Attorney, Agent, or Firm*—Roger A. Fields

[57] ABSTRACT

A film spool comprises a spool core provided with a coaxial opening adapted to receive a rotational driver rotatable alternatively in film winding and unwinding directions to similarly rotate the spool core. The spool core includes first and second torque transmission devices. The first torque transmission devices projects into the core opening to be located in the way of the rotational driver, when the driver is rotated inside the core opening in the film unwinding direction, for making the driver rotate the spool core in the film unwinding direction responsive to the driver applying an unwinding turning force to the first torque transmission devices, and is capable of being deformed out of the way of the driver, when the unwinding turning force the driver applies to the first torque transmission devices exceeds a maximum force greater than required to rotate the spool core in the film unwinding direction, for allowing the driver to freely rotate inside the core opening in the film unwinding direction. The second torque transmission devices projects into the core opening to be located in the way of the rotational driver, when the driver is rotated inside the core opening in the film winding direction, for making the driver rotate the spool core in the winding direction responsive to the driver applying a winding turning force to the second torque transmission devices.

5 Claims, 4 Drawing Sheets

TORQUE TRANSMISSION CLUTCH FOR FILM SPOOL

BACKGROUND OF THE INVENTION

1. Field of the Invention

The invention relates generally to the field of photography, and in particular to a torque transmission clutch for a film spool preferably used in a film cassette.

2. Description of the Prior Art

New film cassettes have been devised, such as disclosed in commonly assigned U.S. Pat. No. 5,151,730, issued Sep. 29, 1992, which, unlike conventional 35 mm film cassettes, will advance at least the film leader of a filmstrip wound on a film spool inside the cassette out of the cassette responsive to rotation of the film spool in a film unwinding direction.

3. Problem to be Solved by the Invention

When one of the new film cassettes is loaded into a camera, a rotational driver is received in a coaxial opening in the spool core of the film spool to rotate the film spool in a film unwinding direction in order to advance the film leader from the cassette for picture-taking. If, however, the film leader initially becomes jammed in the camera, it is necessary to discontinue rotation of the film spool in the film unwinding direction before the filmstrip can be damaged and to rotate the film spool in a film winding direction to return the film leader to the film cassette.

SUMMARY OF THE INVENTION

According to one version of the invention a film spool comprising a spool core provided with a coaxial opening adapted to receive a rotational driver rotatable alternatively in film winding and unwinding directions to similarly rotate the spool core, is characterized in that:

said spool core includes first torque transmission means which projects into the core opening to be located in the way of the rotational driver, when the driver is rotated inside the core opening in the film unwinding direction, for making the driver rotate the spool core in the film unwinding direction responsive to the driver applying an unwinding turning force to the first torque transmission means, and which is capable of being deformed out of the way of the driver, when the unwinding turning force the driver applies to the first torque transmission means exceeds a maximum force greater than required to rotate the spool core in the film unwinding direction, for allowing the driver to freely rotate inside the core opening in the film unwinding direction; and said spool core includes second torque transmission means which projects into the core opening to be located in the way of the rotational driver, when the driver is rotated inside the core opening in the film winding direction, for making the driver rotate the spool core in the winding direction responsive to the driver applying a winding turning force to the second torque transmission means.

According to another version of the invention a rotational driver rotatable in a film unwinding direction, and a film spool comprising a spool core provided with a coaxial opening adapted to receive the rotatable driver to rotate the spool core in the film unwinding direction, are characterized in that:

said rotatable driver includes a shaft and a protuberance biased to extend from the shaft but supported to be retracted into the shaft; and said spool core includes cam means located at the core opening for retracting the protuberance into the shaft, and torque transmission means which projects into the core opening to be located in the way of the protuberance, when the rotational driver is rotated inside the core opening in the film unwinding direction, for making the driver rotate the spool core in the film unwinding direction responsive to the protuberance applying an unwinding turning force to the torque transmission means, and which is capable of being deformed out of the way of the protuberance, when the unwinding turning force the protuberance applies to the torque transmission means exceeds a maximum force greater than required to rotate the spool core in the film unwinding direction, for allowing the driver to rotate inside the core opening in the film unwinding direction to move the protuberance to the cam means.

DETAILED DESCRIPTION OF THE PREFERRED AND ALTERNATE EMBODIMENTS

The invention can be embodied in a 35 mm film cassette such as disclosed in commonly assigned U.S. Pat. No. 5,151,730, issued Sep. 29, 1992 in the names of David B. Kemp, Christopher P. McCormick, and Mark D. Fraser, and entitled FILM CASSETTE. That patent is incorporated by reference into this application.

Preferred Embodiment

Figure 1:
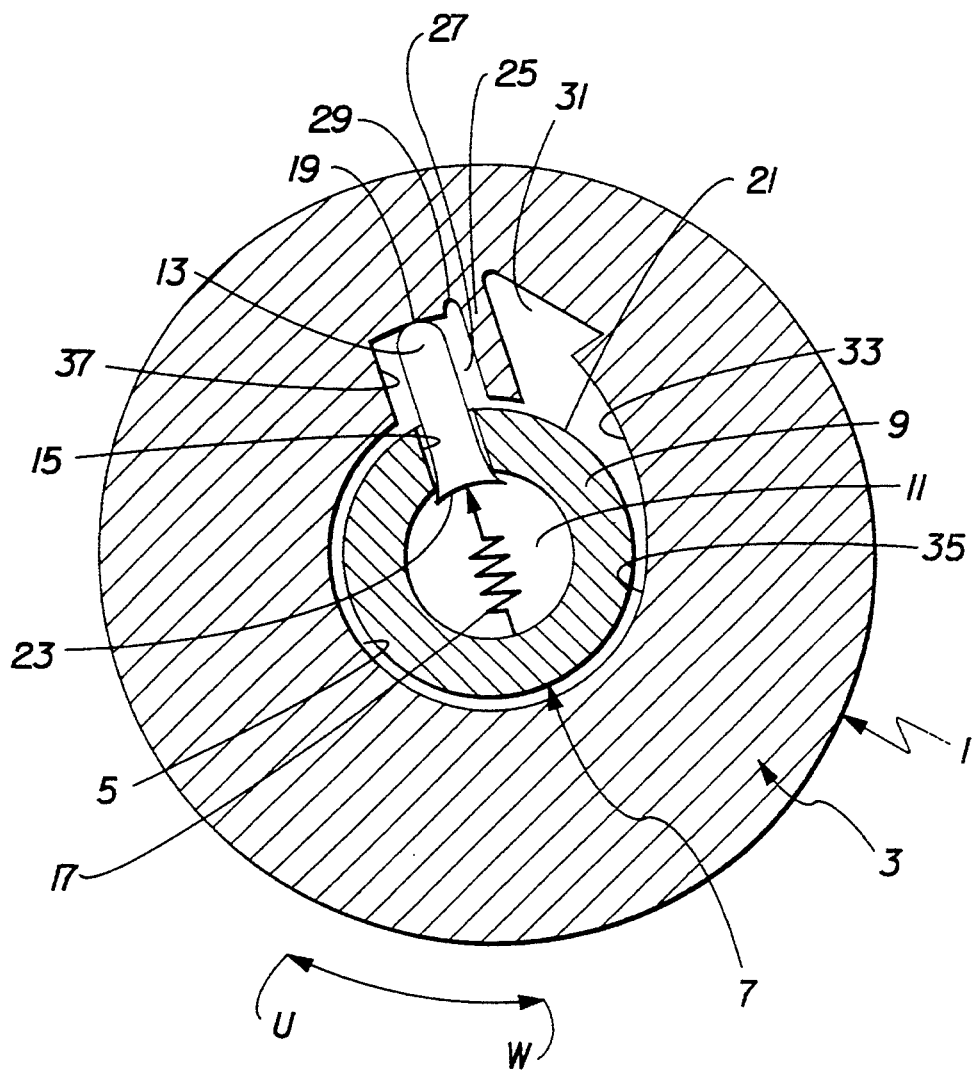
FIG. 1 is a sectional view of a spool core and a rotational driver according to a preferred embodiment of the invention, showing the two in proper relationship for rotating the spool core in a film unwinding direction.

Referring now to FIG. 1 of the drawings, a film spool 1 comprises a spool core or hub 3 provided with a coaxial opening 5 adapted to receive a rotational driver 7 rotatable alternatively in film winding and unwinding directions W and U to similarly rotate the spool core.

The rotational driver 7 may be used in a camera, for example, and comprises a shaft 9 having a central hollow 11 and a radial protuberance 13. The protuberance 13 is supported in a radial slot 15, located in the side of the shaft 9, to be urged radially outwardly by a schematically depicted spring 17 as shown in FIG. 1 but can be retracted into the hollow 11 until its forward end 19 is substantially flush with the peripheral surface 21 of the shaft. A rear end 23 of the protuberance 13 is wider than the slot 15 to limit the extent the spring 17 can urge the protuberance outwardly.

Figure 2:
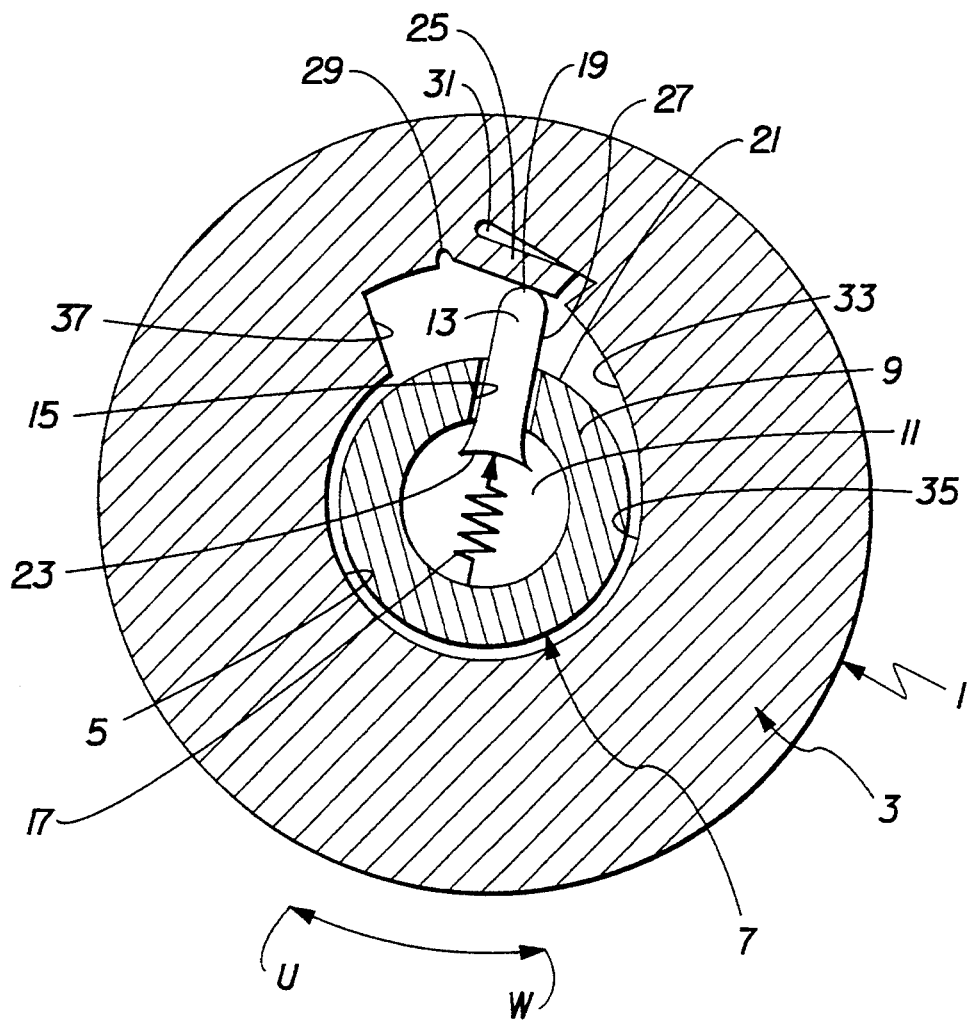
FIG. 2 is a sectional view similar to FIG. 1, showing a torque transmission clutch in a disabled condition.

The spool core 3 includes an integrally formed torque transmission finger 25 which projects into a bulge 27 of the core opening 5 to be located in the way of the protuberance 13, when the rotational driver 7 is rotated inside the core opening in the film unwinding direction U, for making the driver rotate the spool core in the same direction responsive to the protuberance applying an unwinding turning force to the torque transmission finger. See FIG. 1. The torque transmission finger 25 has a weakened end portion 29 to render it capable of being permanently deformed out of the way of the protuberance 13, into a longitudinal cavity 31 which is open lengthwise to the core opening 5. Deformation of the torque transmission finger 25 occurs when there is resistance to rotation of the spool core 3 in the film unwinding direction U which is sufficient to cause the protuberance 13 to deflect the torque transmission finger as shown in FIG. 2. This resistance will occur, for example, during a film jam in a camera. The torque transmission finger 25, when located in the cavity 31, is shaped to conform substantially with, i.e. lead to, a cam edge portion 33. The cam edge portion 33 is tapered generally towards a curved edge contour 35 of the core opening 5 to gradually push the protuberance 13 into the slot 15 as the rotational driver 7 is rotated further in the film unwinding direction U, until the forward end 19 of the protuberance is substantially flush with the peripheral surface 21 of the shaft 9. Thus, the rotational driver V can be rotated inside the core opening 5 in the film unwinding direction U without rotating the spool core 3 in the same direction.

The spool core 3 includes an integrally formed torque transmission wall 37 which is located at the bulge 27 of the core opening 5 to be in the way of the protuberance 13, when the rotational driver 7 is rotated inside the core opening 5 in the film winding direction W, for making the driver rotate the spool core 3 in the same direction responsive to the protuberance applying a winding turning force to the torque transmission wall.

Alternate Embodiment

Figure 3:
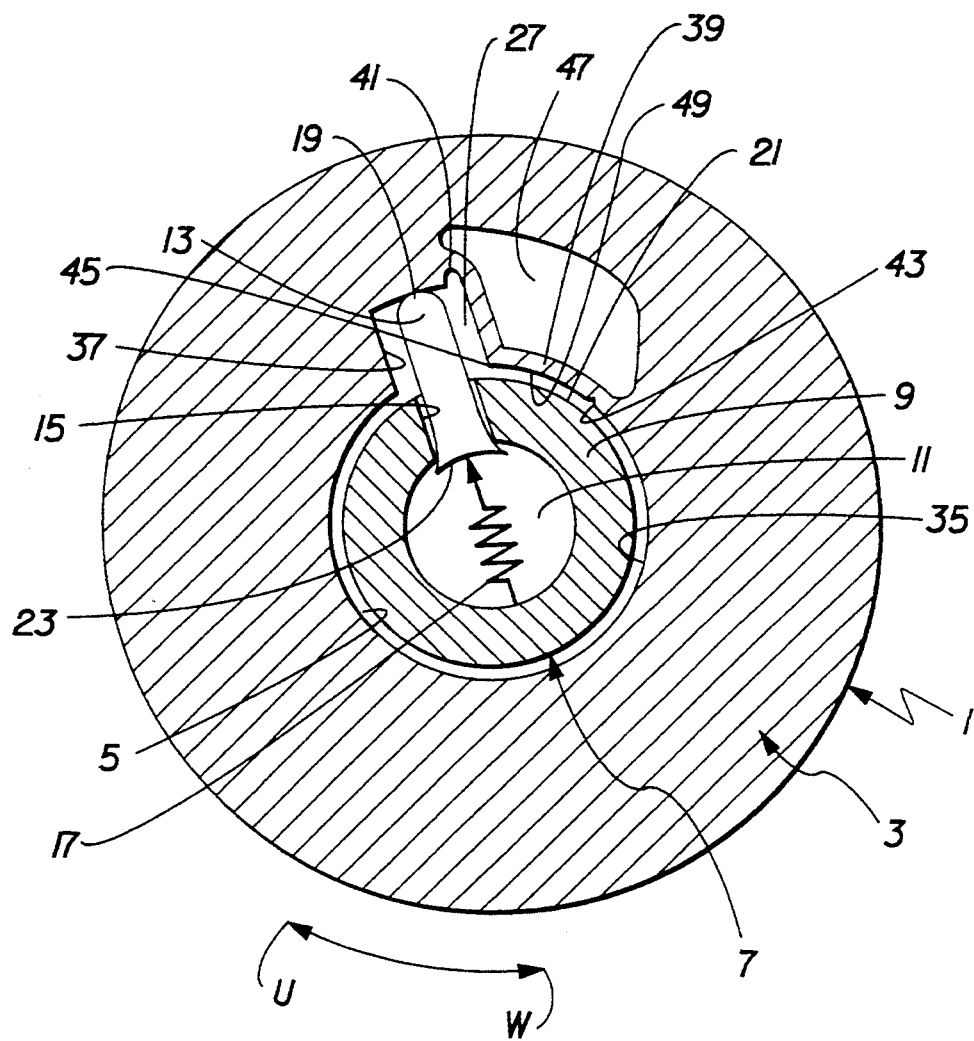
FIG. 3 is a sectional view of a spool core and a rotational driver according to an alternate embodiment of the invention, showing the two in proper relationship for rotating the spool core in a film unwinding direction.
Figure 4:
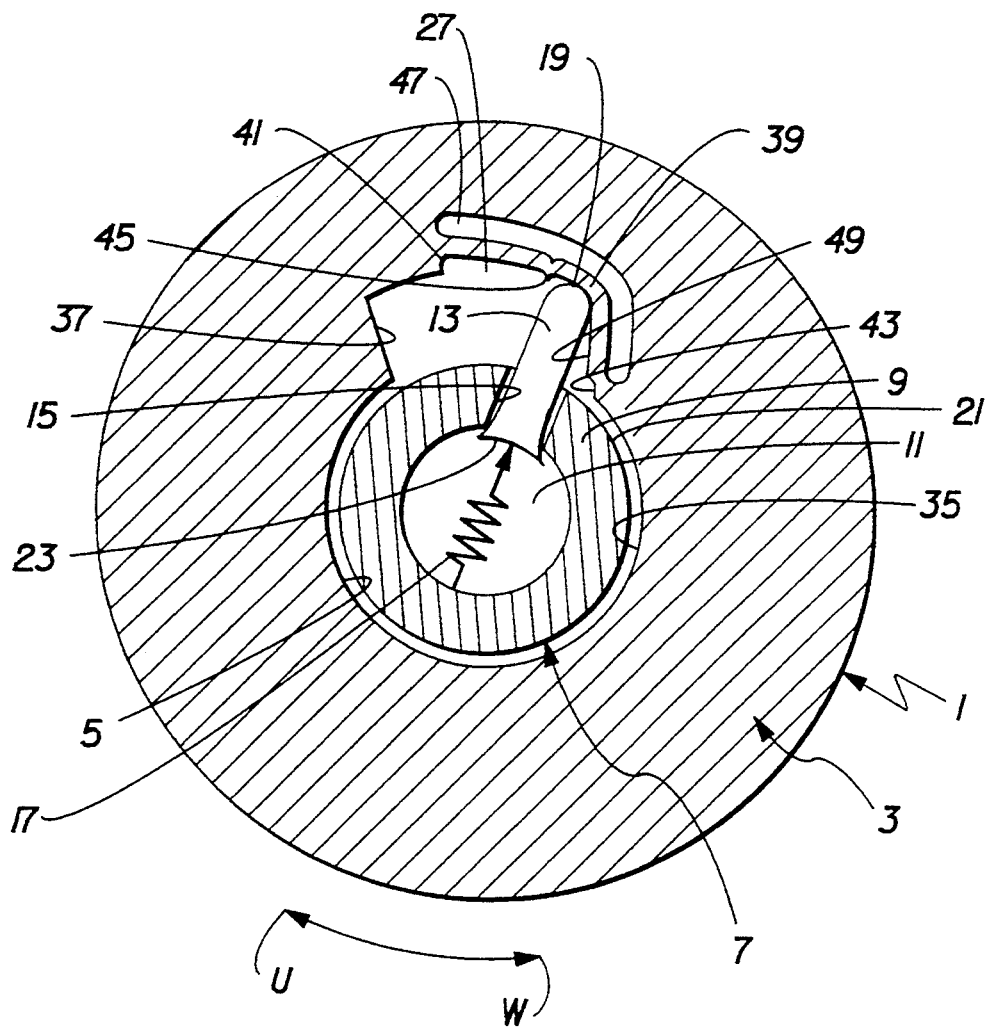
FIG. 4 is a sectional view similar to FIG. 3, showing a torque transmission clutch in a disabled condition.

Referring now to FIGS. 3 and 4 of the drawings, everything is substantially similar to FIGS. 1 and 2 except that a torque transmission rib 39 is shown in place of the torque transmission finger 25. The torque transmission rib 39 has a pair of opposite weakened end portions 41 and 43 and an intermediate portion 45. The intermediate portion 45 is arranged midway between the weakened end portions 41 and 43 to project into the core opening 5 further than any other portion of the torque transmission rib 39 to be located in the way of the protuberance 13 as shown in FIG. 3. The spool core 3 has a cut-out 47 located behind the torque transmission rib 39 for receiving the torque transmission rib 39 beginning with the intermediate portion 45 when the protuberance 13 deforms the intermediate portion out of its way as shown in FIG. 4. A longitudinal edge portion 49 of the torque transmission rib 39, connecting the intermediate portion 45 and the weakened end portion 43, is the equivalent in function of the cam edge portion 33 in FIG. 2.

The invention has been described with reference to preferred and alternate embodiments. However, it will be appreciated that variations and modifications can be can be effected by a person of ordinary skill in the art without departing from the scope of the invention.

Parts List for FIGS. 1-4

1. film spool
3. spool core or hub
5. rotational driver
7. shaft 9
11. central hollow 11
13. radial protuberance
15. radial slot
17. spring
19. forward end
21. peripheral surface
23. rear end
25. torque transmission finger
27. bulge
29. weakened end portion
31. longitudinal cavity
33. cam edge portion
35. curved edge contour
37. torque transmission wall
39. torque transmission rib
41. weakend end portion
43. weakened end portion
45. intermediate portion
47. cut-out
49. longitudinal edge portion
U. film unwinding direction
W. film winding direction

I claim:

1. A film spool comprising a spool core provided with a coaxial opening adapted to receive a rotational driver rotatable alternatively in film winding and unwinding directions to similarly rotate said spool core, is characterized in that:

said spool core includes first torque transmission means which projects into said opening to be located in the path of the rotational driver, when the driver is rotated inside said opening in the film unwinding direction, for enabling the driver to transmit torque to rotate said spool core in the film unwinding direction responsive to the driver applying an unwinding turning force to said first torque transmission means, and which is capable of being deformed out of the path of the driver, when the unwinding turning force the driver applies to said first torque transmission means exceeds a predetermined maximum force greater than required to rotate said spool core in the film unwinding direction, for allowing the driver to freely rotate inside said opening in the film unwinding direction substantially without transmitting torque to the spool core; and said spool core includes second torque transmission means which projects into said opening to be located in the path of the rotational driver, when the driver is rotated inside said opening in the film winding direction, for enabling the driver to transmit torque to rotate said spool core in the winding direction responsive to the driver applying a winding turning force to said second torque transmission means which is greater than the predetermined maximum force.

2. A film spool as recited in claim 1, wherein said second torque transmission means is rigidly fixed with respect to said spool core to prevent the second torque transmission means from being deformed out of the path of the driver.

3. A film spool as recited in claim 1, wherein said opening has an edge contour, and said first torque transmission means is shaped to conform substantially with said edge contour of the opening when the first torque transmission means is deformed out of the path of the driver.

4. A film spool as recited in claim 1, wherein said spool core has a longitudinal cavity which is open lengthwise to said opening to receive said first transmission means when the first torque transmission means is deformed out of the path of the driver.

5. A film spool as recited in claim 1, wherein said first torque transmission means has opposite weakened end portions and an intermediate portion located midway between said weekend end portions to project into said opening further than any other portion of the first torque transmission means, and said spool core has a cut-out located behind said first torque transmission means for receiving said intermediate portion when the first torque transmission means is deformed out of the way of the driver.

* * * * *